(12) United States Patent
Perloff

(10) Patent No.: US 6,754,764 B1
(45) Date of Patent: Jun. 22, 2004

(54) METHOD AND APPARATUS FOR MAINTAINING ORDER IN A PIPELINED PROCESS AND ITS APPLICATION

(75) Inventor: Ronald S. Perloff, Poway, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/468,965

(22) Filed: Dec. 21, 1999

(51) Int. Cl.$^7$ .............................................. G06F 12/00
(52) U.S. Cl. ........................ 711/100; 711/1; 711/152; 711/200; 712/1; 712/220; 718/100; 718/102; 718/104
(58) Field of Search ................................ 709/102, 104; 711/152, 1, 200, 100; 712/1, 34, 220

(56) References Cited

U.S. PATENT DOCUMENTS

| | | | | |
|---|---|---|---|---|
| 5,805,854 A | * | 9/1998 | Shigeeda ........................ 711/1 |
| 5,914,953 A | * | 6/1999 | Krause et al. ............... 370/392 |
| 6,125,430 A | * | 9/2000 | Noel et al. ................... 711/152 |
| 6,233,702 B1 | * | 5/2001 | Horst et al. ................... 714/48 |
| 6,237,079 B1 | * | 5/2001 | Stoney ......................... 712/34 |
| 6,256,347 B1 | * | 7/2001 | Yu et al. ................. 375/240.13 |
| 6,336,180 B1 | * | 1/2002 | Long et al. ................... 712/34 |

* cited by examiner

*Primary Examiner*—Meng-Al T. An
*Assistant Examiner*—Lilian Vo
(74) *Attorney, Agent, or Firm*—Lisa Tom

(57) ABSTRACT

To maintain order in a pipelined process, a number of memory locations of a result memory are sequentially reserved for a number of processes as the processes are sequentially dispatched for execution. As an integral part of the sequential reservation, validity determination facilitators to be subsequently employed to correspondingly facilitate determining whether valid processing results of said processes have been stored into corresponding ones of said reserved memory locations are also pre-determined. Additionally, the reserved memory locations are sequentially read to sequentially accept the processing results in order. Each value read from a reserved memory location is accepted only if the corresponding validity determination facilitator exhibits a predetermined relationship with a corresponding validity determination reference value. The validity determination reference values are complementarily maintained and integrally obtained through the sequential read process.

17 Claims, 4 Drawing Sheets

Sequentially Reserving Memory Locations
of Result RAM

Copying Output of Reserve Counter
n+1 bit reservation number
$MSB_1$ = Validity Indication Facilitation n bits = Write Address

302

Sequentially Reading Result RAM
Generating n+1 bit Expanded Address
$MSB_2$ = Validity Reference Bit n bits = Read Address Set Available Signal to "TRUE"
if $MSB_1$ or $MSB_2$ = TRUE

304

METHOD AND APPARATUS FOR MAINTAINING ORDER IN A PIPELINED PROCESS AND ITS APPLICATION

BACKGROUND OF THE INVENTION

1. Field of the Invention

The present invention relates to the field of data processing and data communication. More specifically, the present invention relates to the techniques for maintaining order in a pipelined process in a data processing or data communication device, where the pipelined processes may be completed out-of-order.

2. Background Information

The performance of some processes can be greatly increase by pipelining techniques in which the process simultaneously handles multiple tasks in various stages of completion. [The term "process", as used herein, includes hardware and/or software.] FIG. 1 illustrates an example look up process that can benefit from such pipelining approaches. The example look up is of a kind that looks for matches between a presented query number 102 and a threaded list of entries 104. Each entry 106 consists of comparand 108, payload 110 and pointer 112. Each pointer 112 points to the location of the next entry, except for the last entry 106, whose "pointer" 112 is set to null. The query number 102 is mapped to an initial pointer 114 that points to the beginning of the list. At each entry, the comparand 108 is matched against the query number 102. If they agree, the look up is successful, and the associated payload 110 is reported as the look up result. If they disagree, and the associated pointer 112 is non-zero, the look up process continues with the next entry 116. The process continues until either a match is found, or the last entry 106 is encountered, where the associated pointer is null (or zero). In such case, the look up process reports failure.

In practical implementations, the threaded lists are typically stored in RAM that takes several clock cycles to access. Thus, overall system performance can be improved if the look up process can be performed for multiples of these queries at the same time. The nature of the look up process, however, is such that some queries take longer to resolve than others, giving rise to the possibility that results can become available out of order.

A specific application where such situations occur is in networking switch and router applications. Network switches/routers receive continuous streams of packets, and the included IP or MAC addresses are queued and examined to determine where the packets should be switched or routed. The determination typically involves data look ups. For performance reasons, it is desirable to be able to perform the look up for multiple of these IP/MAC addresses concurrently in a pipelined multi-stage fashion. However, as alluded to earlier, by virtue of the nature of the look up, data may be found out of order for the various IP/MAC addresses.

Thus, an efficient approach to maintaining order in a pipelined process, without squandering the efficiency gained from pipelining, is desired.

SUMMARY OF THE INVENTION

The method of the present invention includes sequentially reserving a number of memory locations of a result memory for a number of processes as the processes are sequentially dispatched for execution. As an integral part of the sequential reservation, validity determination facilitators to be subsequently employed to correspondingly facilitate determining whether valid processing results of the processes have been stored into corresponding ones of the reserved memory locations are pre-determined. The method further includes sequentially reading the reserved memory locations to sequentially accept the processing results in order. Each value read from a reserved memory location is accepted only if the corresponding validity determination facilitator exhibits a predetermined relationship with a corresponding validity determination reference value. The validity determination reference values are complementarily maintained and integrally obtained through the sequential read process.

BRIEF DESCRIPTION OF DRAWINGS

The present invention will be described by way of exemplary embodiments, but not limitations, illustrated in the accompanying drawings in which like references denote similar elements, and in which.

DETAILED DESCRIPTION OF THE INVENTION

In the following description, various aspects of the present invention will be described, and various details will be set forth in order to provide a thorough understanding of the present invention. However, it will be apparent to those skilled in the art that the present invention may be practiced with only some or all aspects of the present invention, and the present invention may be practiced without the specific details. In other instances, well known features are omitted or simplified in order not to obscure the present invention. Furthermore, repeated usage of the phrase "in one embodiment" does not necessarily refer to the same embodiment, although it may.

Figure 2:
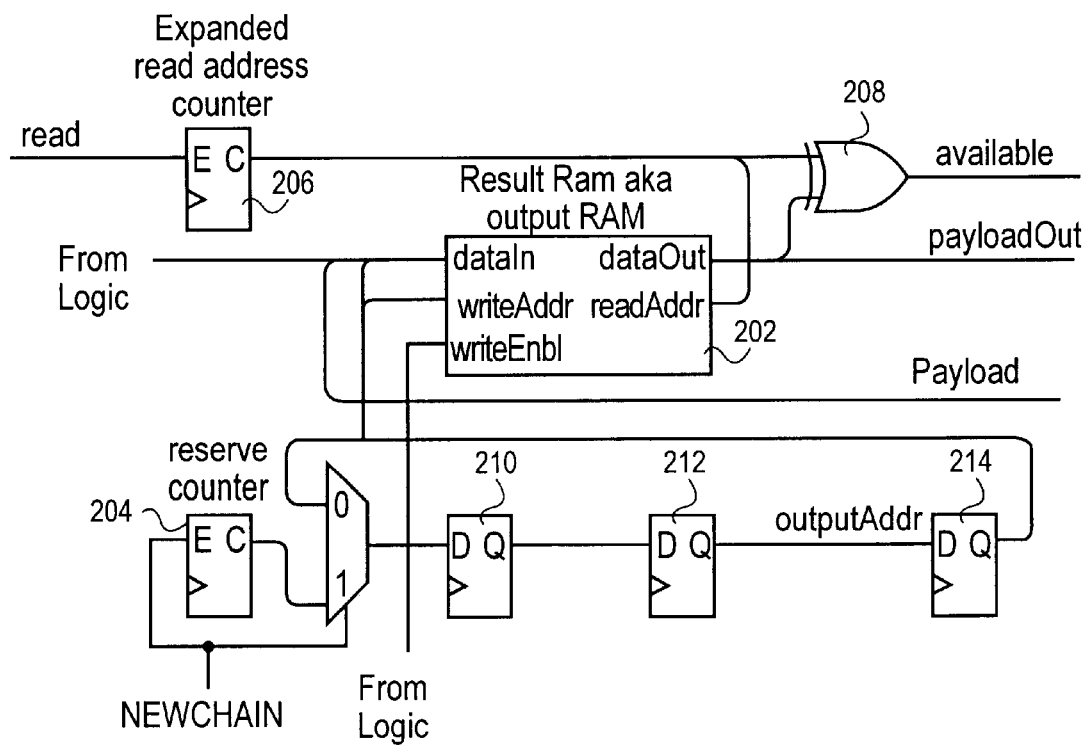
FIG. 2 illustrates an apparatus view of the present invention, including a result memory, and its associated reservation and expanded address counters, in accordance with one embodiment.

Referring now to FIG. 2, wherein an apparatus view of the present invention for maintaining order for a pipelined process are shown. As illustrated, to facilitate the desired maintaining of order, a particular result memory 202 is employed. Result memory 202 includes a number of memory locations for storing the process results for a number of processes sequentially dispatched for execution. However, by virtue of the intrinsic nature of these processes, notwithstanding the sequential manner of dispatching, their execution completion may be out-of-order. For the illustrated embodiment, each memory location is m+1 bit wide, where m bits are employed to store the execution result of a process having reserved the memory location, and the remaining "extra" bit is used to store a validity determination facilitator for facilitating determination on whether the execution result of the process having made the reservation have been stored into the memory location or not, i.e.

whether the memory location currently contains "valid" execution result of the process having made the reservation.

Associated with reservation memory 202 are reservation counter 204, expanded read address counter 206, XOR function 208 and registers 210–214. Both reservation counter 204 and expanded read address counter 206 are n+1 bit in size, where n is the number of bits required to address all the memory locations of result memory 202. That is, both reservation counter 204 and expanded read address counter 206 are one extra bit in size.

Reservation counter 204 is used to sequentially generate an n+1 bit reservation number, where the output of each n+1 bit reservation number serves to effectively reserve the memory location of result memory 202 designated by the lower order n bits of the n+1 bit reservation number. Reservation counter 204 is also used to generate, as an integral part of the reservation process, a validity determination facilitator to be subsequently used to facilitate determination that valid execution results of the process has been stored into the reserved memory location, to be described more fully. Registers 210–214 are used "remember" the reserved memory locations and the validity indicator facilitators to be subsequently used for the pipelined processes. In alternate embodiments, more or less registers may be used correspondingly to pipeline less or more processes.

Expanded read address counter 206 is used to sequentially generate n+1 bit expanded read addresses, where the lower order n bits of each n+1 bit expanded read address are used to access the designated memory location of result memory 202 to cause the designated memory location to output its content. Expanded read address counter 206 is also used to generate, as an integral part of the address generation process, a validity determination reference value to be used in determining whether the content output from the designated memory location should be accepted as valid processing result. As will be explained in more detail below, the acceptance is made in order, thereby maintaining the order of the pipelined processes.

XOR function 208 is used to perform an XOR function on the validity determination facilitator output from an addressed memory location and the validity reference value integrally generated with the read address to generate a state value for an "available" control signal to denote whether the content output from the addressed memory location should be accepted as valid process result of the process who made the reservation. The state value denotes the output should be accepted (i.e. execution result is available) if the two inputs values are different, otherwise the state value denotes the output should not be accepted (i.e. execution result not available).

In other words, reservation counter 204 and expanded address counter 206 are "complementarily" operated, such that the integrally generated validity determination facilitators and the validity reference values will be complementary to each other as required. More specifically, for the illustrated embodiments, counters 204–206 are complementarily operated, such that the integrally generated validity determination facilitators and the validity reference values will be opposite to each other when process results have been written into the reserved memory locations.

Except for the manner these elements are used collectively to practice the present invention, each of these elements in and of themselves individually are known, accordingly will not be otherwise individually described.

Figure 3:
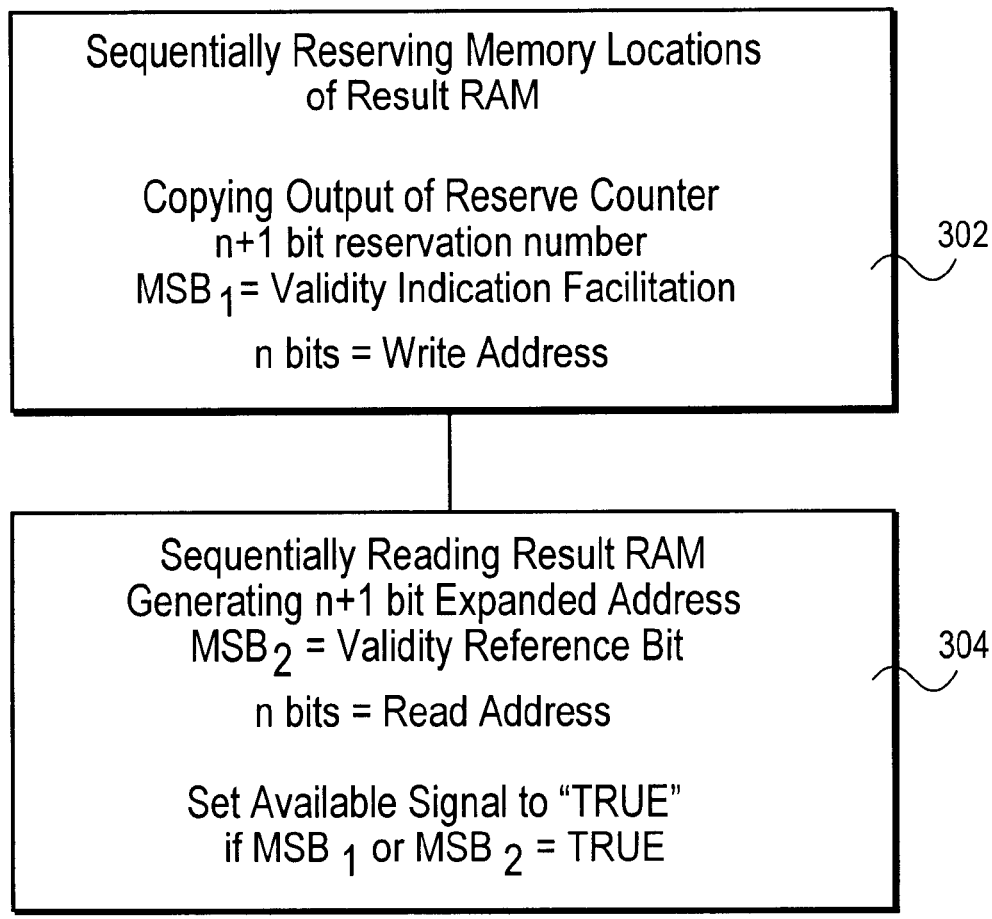
FIG. 3 illustrates the method of the present invention in accordance with one embodiment.

FIG. 3 illustrates a method view of the present invention, in accordance with one embodiment. For the illustrated embodiment, at initialization, the portion of each memory location of result memory 202 to hold a validity determination facilitator is set to zero. All bit positions of reservation counter 204 are set to zero, except for the MSB, which is set to one. Expanded read address counter 206 is set to zero (complementary to the way reservation counter 204 is initialized). Those skilled in the art will appreciate that the two counters 204 and 206 remain complementary to each other, as their MSBs will be complementarily toggled as each of the two counters "overflows" after it has been successively incremented to cover one pass through the memory locations of result memory 202.

During operation, memory locations of result memory 202 are successively or sequentially reserved for the processes as the processes are sequentially dispatched for execution, 302. As an integral part of the sequential reservation, validity determination facilitators to be subsequently employed to correspondingly facilitate determining whether valid processing results of the processes have been stored into corresponding ones of the reserved memory locations are also predetermined. For the illustrated embodiment, this is accomplished by copying the current value of reservation counter 202 and remembering it for the process being dispatched. As described earlier, the lower order n bits of the n+1 bit reservation number will serve as the eventual write address of the process result (thereby effectively reserving the memory location), and the MSB will serve as the corresponding validity determination facilitator. Reservation counter 202 is incremented thereafter for the next process.

Eventually, when the process result of a process becomes available, it is written into the reserved memory location along with the integrally pre-determined validity determination facilitator.

Concurrently, memory locations of reserve memory 202 are sequentially read and examined for sequential acceptance of the process results stored therein, 304. The acceptance process is advanced only if the output content of the memory location currently being examined is accepted, thereby maintaining order of the pipelined process. As an integral part of generating the sequential read address, a validity reference value is also generated. The output content of an examined memory location is accepted if the concurrently stored validity determination facilitator has a predetermined relationship with the integrally generated validity reference value. In one embodiment, the output content is accepted if the two values are opposite to each other. The acceptance is caused by setting an available control signal to "true".

For the illustrated embodiment, the read address and the associated validity reference value are derived from the output of the expanded read address counter 204. As described earlier, the lower order n bits of the n+1 bit expanded read address value serves as the read address, while the MSB serves as the corresponding validity reference value. Expanded address counter 204 is incremented after each acceptance.

Figure 1:
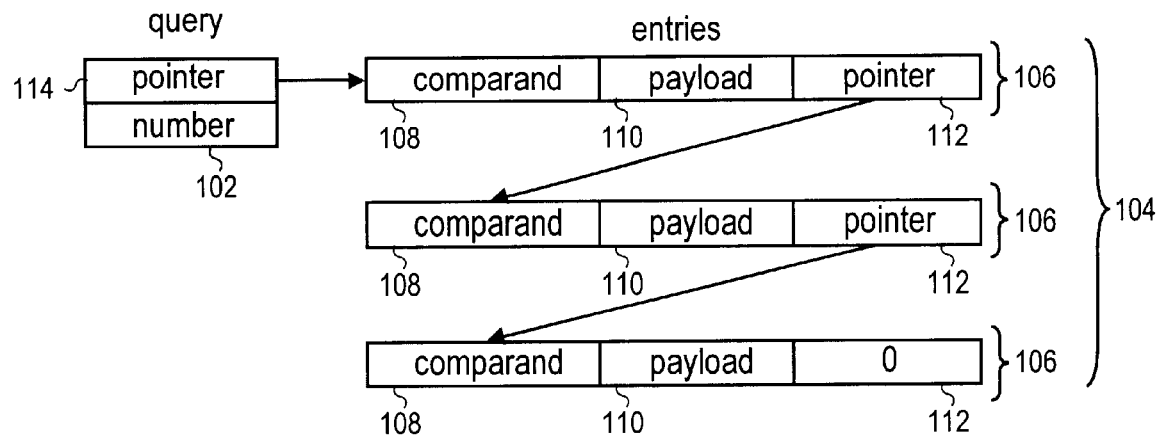
FIG. 1 illustrates an example look up application that can benefit from the order maintaining technique of the present invention.
Figure 4:
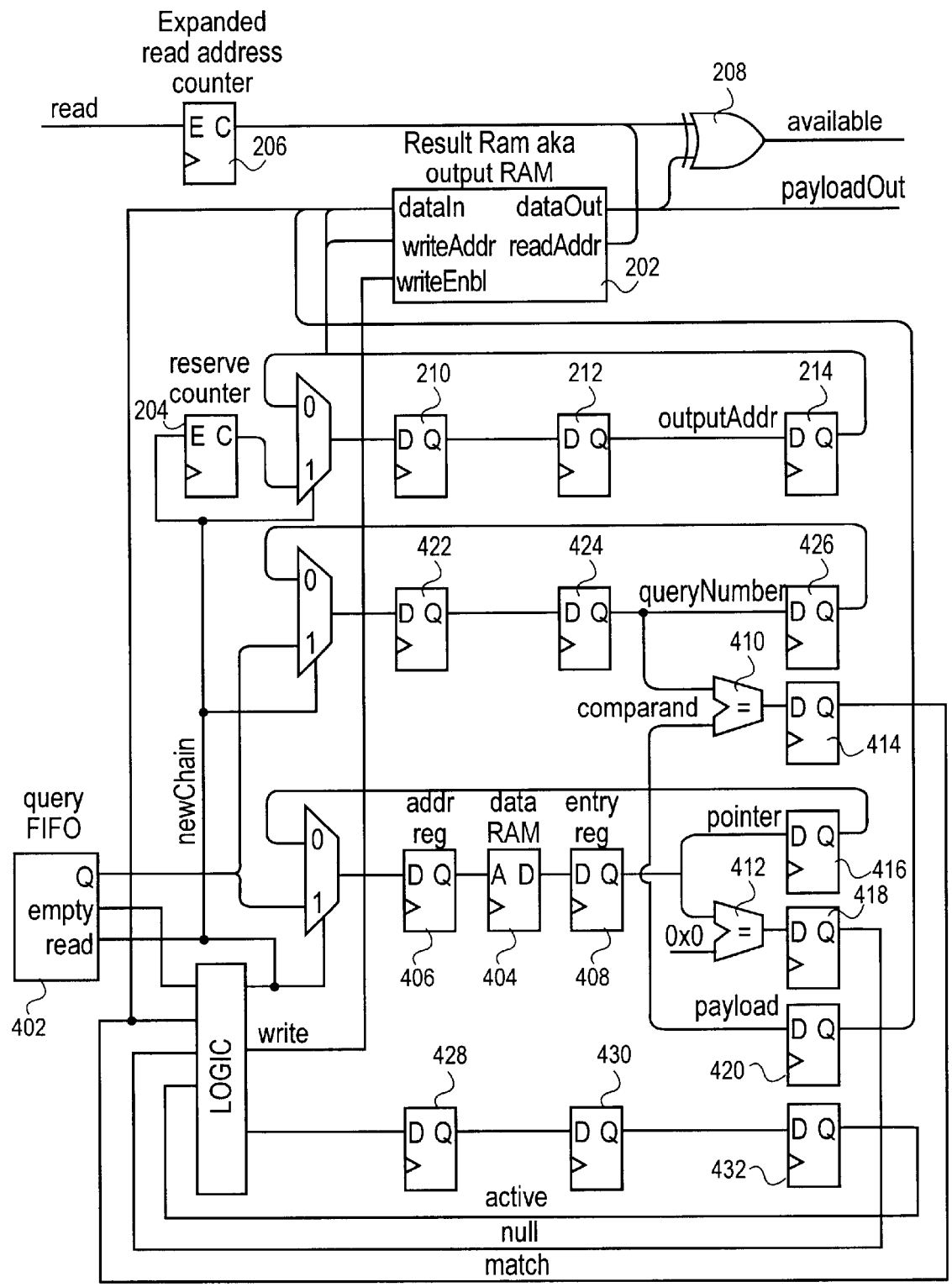
FIG. 4 illustrates an example implementation incorporated with the teachings of the present invention that supports up to three concurrent example look ups of FIG. 1.

FIG. 4 illustrates an example implementation incorporated with the teachings of the present invention that supports up to three concurrent example look ups of FIG. 1. The implementation includes earlier described result RAM 202 (also referred to as output RAM), and its associated reservation counter 204, expanded read address counter 206, XOR function 208 and registers 210–214, of the present invention. They function as earlier described to maintain order of the pipelined processes, i.e. order availability of the look up results.

Additionally, the implementation further includes a conventional FIFO 402 for storing the presented query numbers, and data RAM 404 to store the threaded lists. The implementation further includes address register 406 to store an address for accessing an entry of a threaded list, and entry register 408 to store a retrieved entry. Comparators 410 and 412 are used to determine if the comparand of an entry matches a presented query number and whether the pointer of an entry is null. Registers 414–420 are used to store the result of the comparison with the "current" retrieved entry, the "next" pointer of the "current" retrieved entry, the results of the comparison on whether the "next" pointer of the "current" retrieved entry is null or not, and the payload of the "current" retrieved entry. Registers 422–426 and registers 428–432 are used to store three presented query numbers "popped off" FIFO 402, and their associated "control information". Together, each of the corresponding register pair, 422 and 428, 424 and 430, 426 and 432, constitutes the "context" of the corresponding query, and it is circulated until the look up process for the query is determined to be successful or failed. Finally, logic block 436 controls the overall operation of the implementation.

Upon initialization, which includes resetting activity registers 428–432, logic block 436 waits for the combination of a "false" query FIFO empty line, indicating FIFO 402 holds a new query, AND a "false" full line from result RAM 434, indicating there is room in result RAM 434 to store the look up result, AND EITHER a "false" activity bit, indicating there is no activity in the "current" time slot, OR an asserted match signal, OR an asserted null signal, either of which indicates the end of an earlier query. When these conditions are met, logic block 436 asserts the "newChain" signal, which causes the following events to occur at the next clock cycle:

1) address register 406 uses the query pointer as the next RAM address;
2) register 422 copies the query number, and
3) activity register 428 is set TRUE.

[Note that the "full" line of result RAM 434 is actually set to a threshold equal to the capacity of result RAM 434 minus the number of pipeline stages, which equals three in this example.]

In a subsequent clock cycle, logic block 436 makes a new, independent decision about whether it can accept the next query. Meanwhile, the RAM data resulting from the query initiated above are copied into entry register 408, and the second set of "context" registers copy the data from the first set of "context" registers to stay aligned with the data.

In the next clock cycle, the following takes place:
1) the result of the comparison of the query number to the comparand of the retrieved entry is stored into register 414;
2) the result of comparing the forward pointer to zero is stored into register 418;
3) pointer register 416 copies the forward pointer of the retrieved entry in case the list must be searched further;
4) payload register 420 copies the payload from the retrieved entry in case the match was successful; and
5) the "context" registers are successively copied.

On the next clock, the contexts and the results of the current entry are available to logic block 436. If activity is "true", AND EITHER match OR null are "true", logic block 436 asserts the write line so that the look up results are written into result RAM 434 at the indicated location (along with the predetermined validity determination facilitator).

If the above conditions for ending a query are not met, then logic block 436 drives the "newChain" signal "false". In that case, on the next clock,
1) address register 406 would copy the fed back pointer to use as the next RAM address,
2) query number register 422 would copy the fed back query number, and
3) activity register 428 would copy the fed back activity value.

In applications where each query number can be a very large binary number (such as networking applications where the query numbers are lengthy IP or MAC addresses), registers 422–426 can take substantial amount of hardware to implement, especially if more look-ups are pipelined. In an alternate embodiment, conventional FIFO 402 is replaced with an enhanced FIFO that is equipped to support random re-read of memory locations previously read in sequence. The registers 424–426 may be replaced with much smaller registers for remembering recirculate read addresses. As a result, substantial amount of hardware savings may be achieved. Randomly readable FIFO is the subject of co-pending application<to be added>, entitled "A FIFO With Random Re-read Support and Its Applications", having common inventorship with the present application, and contemporaneously filed.

Figure 5:
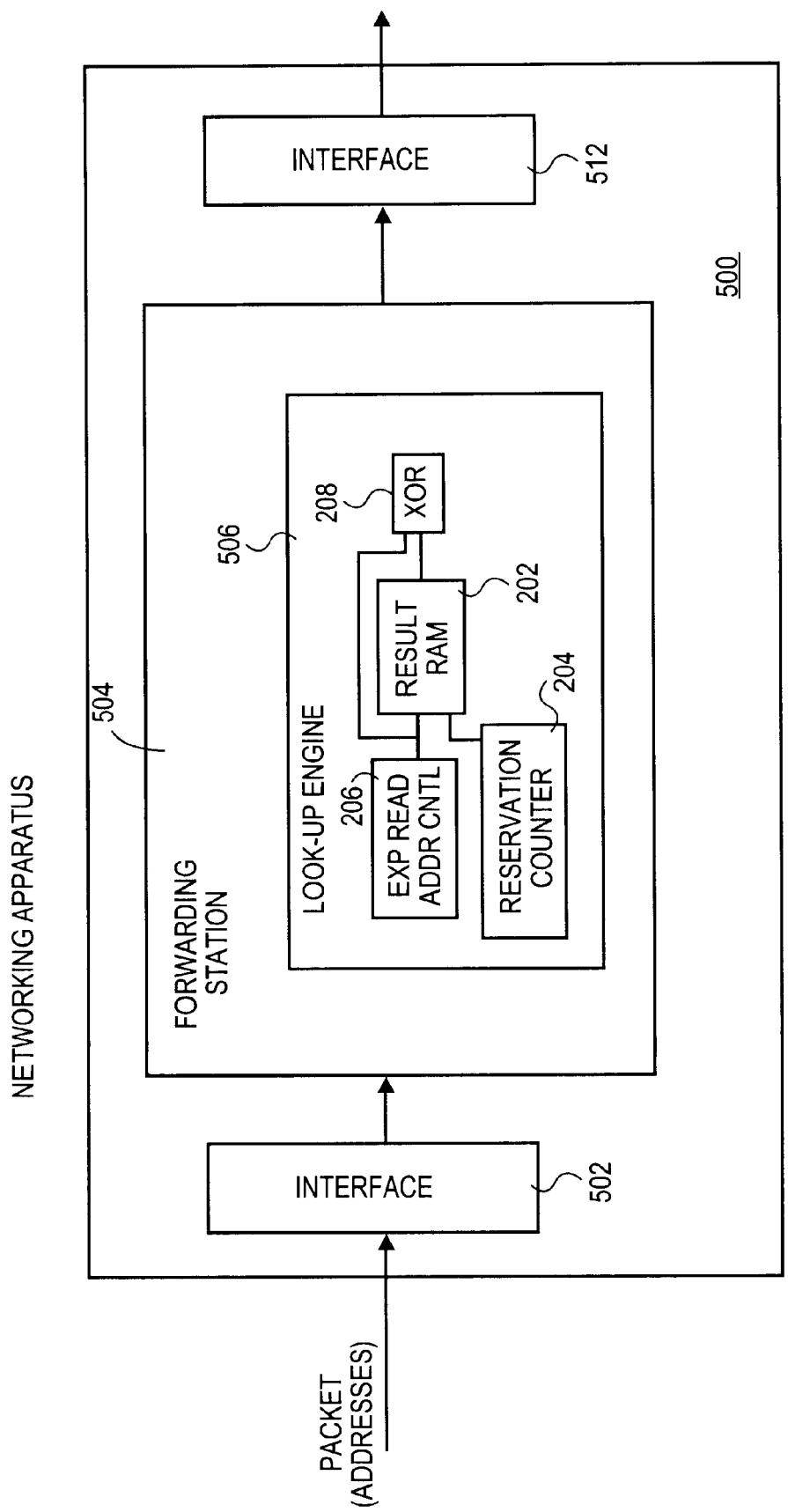
FIG. 5 illustrates an example application of the look up engine of FIG. 4.

Referring now to FIG. 5, wherein an example application of the enhanced look up engine of FIG. 4 is shown. As illustrated, networking device 500 includes first and second I/O interfaces 502 and 512 and forwarding section 504. Forwarding section 504 includes look up engine 506 for looking up data associated with addresses, such as IP or MAC addresses. Look up engine 506 is provided with result RAM 202, its associated reservation counter 204, expanded read address counter 206 and XOR function 208 of the present invention (as earlier described referencing FIG. 4). Except for result RAM 202 and the companion counters 204–206 and their manner of operation, networking device 500 is intended to represent a broad range of networking devices known in the art, including but not limited to routers and switches.

Accordingly, a novel method and apparatus for maintaining order for pipelined processes, and its application (in particular, to networking applications) have been described.

Epilogue

From the foregoing description, those skilled in the art will recognize that many other variations of the present invention are possible. Thus, the present invention is not limited by the details described, instead, the present invention can be practiced with modifications and alterations within the spirit and scope of the appended claims.

What is claimed is:

1. A method comprising:
sequentially reserving a plurality of memory locations of a result memory for a plurality of processes as the processes are sequentially dispatched for execution, wherein sequentially reserving includes reading an n-bit reservation counter associated with the result memory to obtain an n-bit reservation value to reserve for one of the plurality of processes one of the plurality of memory locations of the result memory designated by n−1 bits of the obtained n-bit reservation value, and pre-determining validity determination facilitators to correspondingly facilitate determining whether valid processing results of the processes have been stored into corresponding ones of the reserved memory locations;

sequentially reading the reserved memory locations to sequentially accept the processing results in order, accepting each value read from a reserved memory location only if the corresponding validity determination facilitator exhibits a predetermined relationship with a corresponding validity determination reference value; and writing one of the processing results of the processes along with the corresponding validity determination facilitator into the corresponding reserved memory location of the result memory using the n−1 bits of the n-bit reservation value.

2. The method of claim 1, wherein sequentially reserving further comprises incrementing the n-bit reservation counter before a next one of the plurality of processes is dispatched.

3. The method of claim 2, wherein sequentially reading further comprises outputting an n-bit expanded read address value from an n-bit expanded read address counter associated with the result memory;

applying the lower order n−1 bits of the n-bit expanded read address value to the result memory to cause outputting of content from the corresponding memory location of the result memory designated by the n−1 bits; and setting an available control signal to designate a first portion of the output of the result memory as valid processing result if a second portion of the output is determined to be related to a most significant bit (MSB) of the n-bit expanded read address value.

4. The method of claim 3, further comprising incrementing the n-bit expanded address counter if the available control signal designates the first portion of the output as valid processing result.

5. A method comprising:

sequentially reserving a plurality of memory locations of a result memory for a plurality of processes as the processes are sequentially dispatched for execution, and pre-determining validity determination facilitators to be subsequently employed to correspondingly facilitate determining whether valid processing results of the processes have been stored into corresponding ones of the reserved memory locations;

sequentially reading the reserved memory locations to sequentially accept the processing results in order, accepting each value read from a reserved memory location only if the corresponding validity determination facilitator exhibits a predetermined relationship with a corresponding validity determination reference value, wherein sequentially reading the reserved memory locations includes:

outputting an n-bit expanded read address value from an n-bit expanded read address counter associated with the result memory, applying n−1 bits of the n-bit expanded read address value to the result memory to cause outputting of content from a corresponding memory location of the result memory designated by the n−1 bits, and setting an available control signal to designate a first portion of the output of the result memory as valid processing result if a second portion of the output has the predetermined relationship with a most significant bit (MSB) of the n-bit expanded read address value; and incrementing the n-bit expanded address counter if the available control signal designates the first portion of the output as valid processing result.

6. An apparatus comprising:

a memory array having a plurality of memory locations;

a n-bit reservation counter, coupled to the memory array, to sequentially generate a plurality of n-bit reservation values, with n−1 bits of each of the n-bit reservation values to be subsequently applied to the memory array to store one of a plurality of processing results of a plurality of processes into one of the memory locations of the memory array correspondingly designated by the n−1 bits, and to integrally predetermine validity determination facilitators to be subsequently employed to facilitate determining whether valid processing results of the processes have been stored into corresponding memory locations of the memory array; and an n-bit expanded read address counter coupled to the memory array, to sequentially generate a plurality of n-bit expanded address values, with n−1 bits of each of the n-bit expanded address values to be successively applied to the memory array to cause sequential outputting of content from the corresponding memory location designated by the n−1 bits.

7. The apparatus of claim 6, wherein each of the integrally predetermined validity determination facilitators is a most significant bit (MSB) of one of the n-bit reservation values and the apparatus further comprises a XOR function to perform an XOR operation on one of the predetermined validity determination facilitators and a corresponding one of a plurality of validity determination reference values to produce one of a plurality of state values for an available control signal to denote whether a corresponding output from one of the memory locations is a valid processing result, each of the plurality validity determination reference values being a MSB of one of the n-bit expanded address values.

8. The apparatus of claim 6, wherein the apparatus is a sub-assembly including a look up engine to look up data associated with inputs, and said memory array and reservation counter are part of said look up engine.

9. The apparatus of claim 6, wherein the apparatus is a networking device including a forwarding section to look up data associated with addresses, and said memory array and reservation counter are part of said forwarding section.

10. The apparatus of claim 9, wherein the networking device is a networking device selected from a group consisting of a gateway, a router, and a switch.

11. The apparatus of claim 10, wherein said addresses are addresses selected from a group consisting of IP addresses and MAC addresses.

12. An apparatus comprising:

a memory array having a plurality of memory locations; and an n-bit expanded read address counter coupled to the memory array, to sequentially generate a plurality of n-bit expanded address values, with n−1 bits of each of the n-bit expanded address values to be successively applied to the memory array to cause sequential outputting from the memory location of the memory array designated by the n−1 bits, and the most significant bit (MSB) of each of the n-bit expanded address values to be correspondingly employed as one of a plurality of validity determination reference values to assist in sequentially determining whether to accept a first portion of an output from one of the memory locations as a valid processing result.

13. The apparatus of claim 12, wherein the expanded read address counter is incremented if the first portion of the output from one of the memory locations is accepted as a valid processing result.

14. The apparatus of claim 12, wherein the apparatus is a sub-assembly including a look up engine to look up data associated with inputs, and said memory array and expanded address counter are part of said look up engine.

15. The apparatus of claim 12, wherein the apparatus is a networking device including a forwarding section to look up data associated with addresses, and said memory array and expanded address counter are part of said forwarding section.

16. The apparatus of claim 15, wherein the networking device is a networking device selected from a group consisting of a gateway, a router, and a switch.

17. The apparatus of claim 16, wherein said addresses are addresses selected from a group consisting of IP addresses and MAC addresses.

* * * * *

UNITED STATES PATENT AND TRADEMARK OFFICE
CERTIFICATE OF CORRECTION

PATENT NO. : 6,754,764 B1
DATED : June 22, 2004
INVENTOR(S) : Perloff

It is certified that error appears in the above-identified patent and that said Letters Patent is hereby corrected as shown below:

Column 6,
Line 48, delete "obtained".
Line 56, delete "the" and insert -- a --.

Column 7,
Line 6, delete "the lower order".
Lines 8 and 40, delete "outputting" and insert -- an output --.
Line 54, delete "a" and insert -- an --.

Column 8,
Line 41, delete "the" and insert -- a --.

Signed and Sealed this

Eleventh Day of January, 2005

JON W. DUDAS
*Director of the United States Patent and Trademark Office*